Oct. 11, 1966  W. D. HUSTON  3,277,722
PRESSURE SENSING INSTRUMENT
Filed Aug. 23, 1962  2 Sheets-Sheet 1
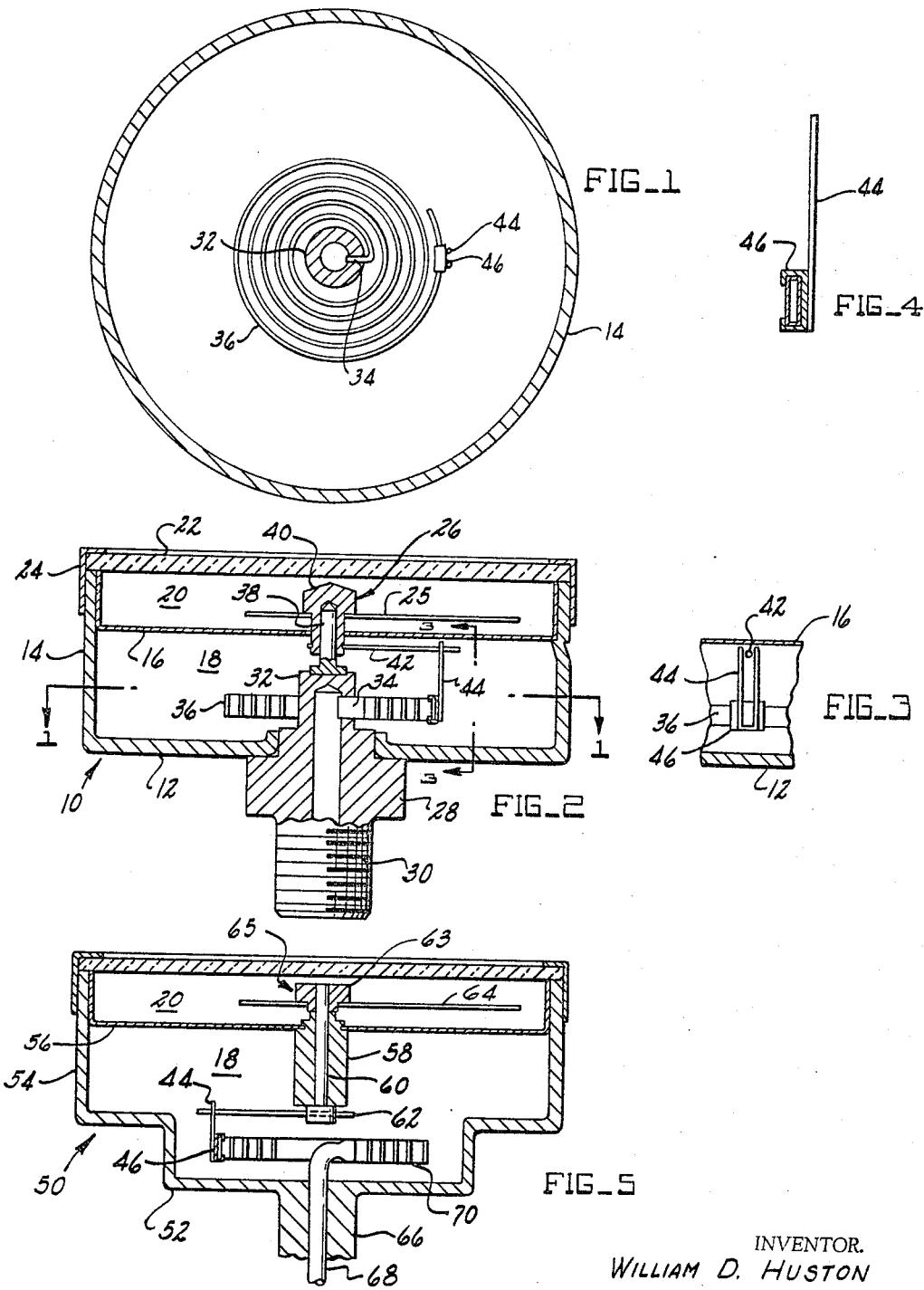
INVENTOR.
WILLIAM D. HUSTON
BY
Andrew K. Jouda
his ATTORNEY

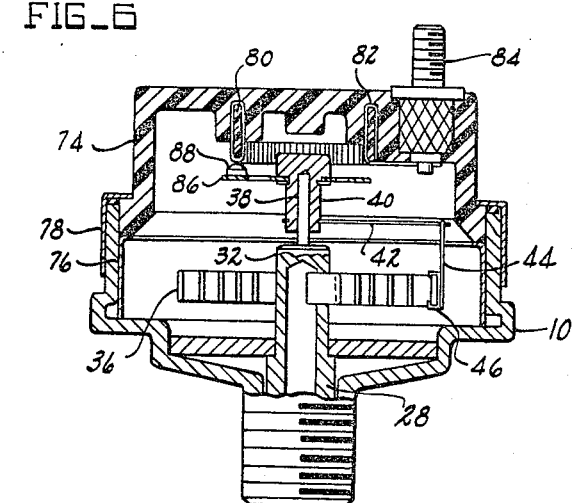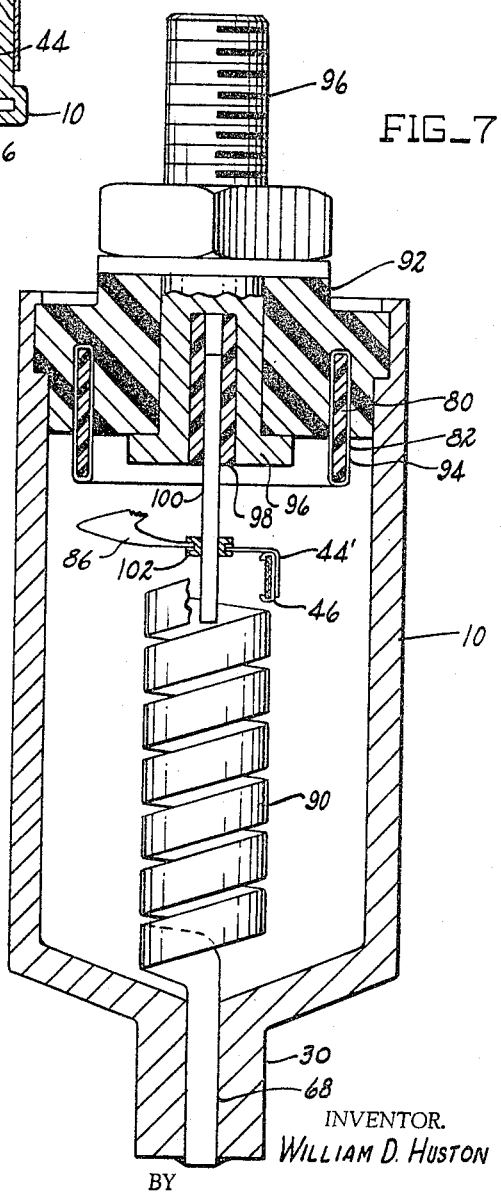

United States Patent Office 3,277,722
Patented Oct. 11, 1966

3,277,722
PRESSURE SENSING INSTRUMENT
William D. Huston, Rochester, N.Y., assignor to American Radiator & Standard Sanitary Corporation, New York, N.Y., a corporation of Delaware
Filed Aug. 23, 1962, Ser. No. 218,957
1 Claim. (Cl. 73—418)

This invention relates to fluid pressure sensing instruments of the type which are operated for example by pressure changes in fluid lines, tanks or thermostatic bulbs.

A general object of the invention is to provide a simple, reliable and rugged pressure sensing instrument characterized by low manufacturing cost and long service life.

A further object is to provide a pressure sensing instrument wherein the overall instrument casing diameter is relatively small, as for example on the order of one or two inches.

In connection with the above, an additional object is to provide a construction which most effectively utilizes the instrument casing space for sensing and indicating purposes.

An additional object is to provide a pressure sensing instrument which can be built in different models to accurately sense pressures in various different ranges, as for example in a low pressure range from 0 to 15 p.s.i. or in a higher pressure range from 1000 to 5000 p.s.i.

A further object is to provide a pressure sensing instrument which can be easily calibrated.

Another object is to provide a pressure sensing instrument which utilizes a simply constructed force-transmitting connection between the pressure sensing element and the pressure indicating element.

An additional object is to provide a pressure sensing instrument having a pressure sensing element which moves through a substantial arcuate distance, whereby the indicating element can be directly connected with the sensing element without the necessity for motion-multiplying devices therebetween.

Other objects of this invention will appear from the following description and appended claim, reference being had to the accompanying drawings forming a part of this specification wherein like reference characters designate corresponding parts in the several views.

In the drawings:

FIGURE 1 is a sectional view of one embodiment of the invention taken on line 1—1 in FIG. 2;

FIG. 2 is a sectional view taken on line 2—2 in FIG. 1;

FIG. 3 is a fragmentary view taken on line 3—3 in FIG. 2;

FIG. 4 is an enlarged fragmentary view showing part of the FIG. 2 structure;

FIG. 5 is a sectional view through a second embodiment of the invention;

FIG. 6 is a sectional view taken through another embodiment of the invention; and FIG. 7 is a sectional view taken through a further embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring in detail to the drawings, particularly FIG. 2, there is shown a pressure-sensing instrument including a tubular instrument base or housing 10 having a bottom wall 12 and an annular upstanding side wall 14. Fixedly disposed within housing 10 is a partition 16 which forms a first sensing mechanism compartment 18 and a second indicator mechanism compartment 20. Compartment 20 is closed by means of a transparent crystal 22 which is suitably held in place by a bezel 24. The upper face of partition 16 may be provided with suitable indicating indicia thereon for cooperation with the rotary indicator assembly 26.

Extending upwardly through the bottom wall 12 of housing 10 is a pressure conduit 28 having a lower externally threaded portion 30 and an upper hollow post portion 32. A side surface of the post portion is provided with an opening to fixedly and sealingly receive the end portion 34 of a multi-convolution Bourdon tube 36. As shown in FIG. 1 the Bourdon tube spirals radially outwardly from portion 32 of the pressure conduit 28, and as shown in FIG. 2 the Bourdon tube is located in a single plane extending generally parallel with partition 16. By making the Bourdon tube with a multiple number of convolutions I am able to obtain a large travel of its outermost convolution so as to eliminate the necessity for motion-multiplying devices of the gear or link type.

The upper end of post portion 32 is recessed to fixedly receive the enlarged base portion of an upstanding pivot shaft or bearing element 38. Seated on element 38 is a hub 40 which cooperates with a pointer 25 to define the indicator assembly designated generally by numeral 26. As best shown in FIG. 2, the upper end of shaft 38 and the adjacent internal surface of hub 40 are conically configured, with the cone angle of the shaft being less than the cone angle on the hub surface so that a low friction connection is established between the shaft and hub. The hub at its lower end portion carries an arm 42 which extends radially outwardly into the yoke-like arm 44. As best seen in FIG. 4, arm 44 is carried on a C-shaped saddle member 46 which partially encircles the outermost convolution of the Bourdon tube. It will be seen that arms 42 and 44 cooperate with member 46 to define a force-transmitting connection between the Bourdon tube and hub 40 so that arcuate movement of the Bourdon tube in response to pressure change therein effects a corresponding movement of the indicator assembly 26.

The configuration of element 46 is such that it may be temporarily positioned at different points along the Bourdon tube. Thus during the calibrating period the assembly of arm 44 and saddle 46 may be set at different points on tube 36, and at each set location of the saddle a predetermined test pressure may be applied to the tube until a satisfactory travel of arm 44 is obtained. When the correct position of arm 44 is established the saddle 46 may be fixedly secured to the Bourdon tube, as by means of any suitable adhesive. Correlation of the pointer assembly 26 and the indicia on partition 16 may be accomplished by rotational adjustment of partition 16 prior to installation of crystal 22. Alternately pointer element 25 could have an adjustable fit on hub 40 to provide the correlation.

Referring now to the FIG. 5 embodiment, there is shown a tubular instrument housing 50 having a bottom wall 52 and an annular side wall 54. Fixedly disposed within the housing is a dial-forming partition 56, the central portion of which fixedly carries a sleeve bearing 58. Extending through the sleeve bearing is a pivot shaft 60 having its lower end connected with a radial arm 62 and having its upper end connected with a hub 63. The hub carries an indicating pointer 64 and cooperates therewith in forming the indicator assembly designated generally by numeral 65.

Wall 52 of the housing is provided with an enlarged hollow boss 66 which receives the upstanding fluid pressure conduit 68. This conduit is of circular cross section and is formed integrally with the multi-convolution spiral Bourdon tube 70. The outer convolution of the Bourdon tube mounts a saddle-arm assembly comprised of elements 46 and 44; during operation of the instrument the saddle-arm assembly transmits the arcuate winding and unwinding motion of the Bourdon tube to the rotary shaft 60 and pointer 64.

Referring now to FIG. 6, there is shown a pressure sensing instrument which converts fluid pressure into electric current change, thus making the instrument useful for remote indication or control. The instrument is similar to the FIG. 2 instrument in the employment of a tubular instrument housing or base 10, a pressure conduit 28 having an upper hollow post portion 32, and a multi-convolution spiral Bourdon tube 36 extending from the post portion to effect arcuate movement of the arm 44 in accordance with variations in sensed pressure. The FIG. 6 instrument also comprises a bearing in the form of an upstanding shaft 38, and a hub element 40 operatively connected with the arm 44, as by means of a radial arm 42.

Hub element 40 is disposed within a molded dielectric cover 74 suitably retained on base 10 by means of a spacer 76 and collar 78. Arranged within cover 74 is an electrical resistance element comprising an arcuate dielectric support 80 and a length of resistance wire 82 wound thereon. One end of the resistance wire is connected with the stud-type terminal 84.

Hub element 40 carries an indicator element in the form of a slider-forming spring element 86, said element being of generally circular configuration but being provided with a spiral slot so that it forms a generally spiral arm. The outer end of arm 86 carries an electrical contact 88 which registers with resistance winding 82 so as to move therealong during winding and unwinding movement of the Bourdon tube 36. Arm 86 is preferably constructed so that its outer end wants to be slightly above the level of its inner end. Therefore the installation of cover element 74 causes the resistance element to bias the arm 86 downwardly from its free position such that a satisfactory pressure engagement exists between contact 88 and winding 82. In the illustrated instrument the contact 88 current is grounded through housing 10.

During operation of the FIG. 6 embodiment the terminal 84 is connected to a substantially constant source of voltage so that variations in fluid pressures sensed by Bourdon tube 36 are effective to vary the current flow through the instrument. The instrument thus provides for remote pressure indication or control.

The FIG. 7 embodiment functions similarly to the FIG. 6 embodiment, but differs structurally therefrom. In the FIG. 7 embodiment there is provided a tubular base or housing 10 having a hollow extension 30 which fixedly receives the cylindrical fluid pressure supply conduit 68 for the helical Bourdon tube 90. The uppermost convolution of tube 90 accommodates a saddle member 46 which is connected with the arm 44'.

Extending across the upper end of housing 10 is a dielectric cover element 92 having a resistance element 94 constructed as an insert therein. The construction of resistance element 94 corresponds with that of the previously described resistance element, and comprises an arcuate dielectric support 80 and resistance wire winding 82. One end of the resistance wire connects with a stud-like terminal 96 which extends through the cover element 92.

As shown in FIG. 7, the lower end portion of terminal 96 is provided with a bore for fixedly accommodating the insulator sleeve 98. Anchored within sleeve 98 is a bearing shaft 100 which depends through the hub portion 102 carried on the radially extending portion of arm 44'. Hub portion 102 also extends through an opening in the indicator element spring arm 86 so as to connect the two arms together and operatively support the helical Bourdon tube against undesired deflection or wavering within housing 10. Spring arm 86 is similar to the aforementioned FIG. 6 slider arm, and extends around shaft 100 so that its free end (not shown) registers with the resistance element 94. The free end of arm 86 carries a contact similar to contact 88, so that the general operation of the FIG. 7 construction is similar to the operation of the FIG. 6 embodiment.

Each of the illustrated embodiments utilizes a multi-convolution Bourdon tube having an oblong cross section with the longest cross sectional dimension of the tube extending parallel to the convolution axis so that the tube is reinforced against axial distortion, as by vibrations or the like. The Bourdon tube has at least three convolutions (and preferably more than three) to facilitate a satisfactory arcuate movement of the driven elements 26, 64 or 86 without need for motion-multiplying devices of the gear or link type. Each instrument may be used to sense fluid pressures in any fluid atmosphere to which its fluid pressure conduit is exposed, including fluid flow lines, fluid storage tanks, or thermostatic bulbs.

Each of the illustrated embodiments is characterized by the fact that its Bourdon tube is disposed centrally within the instrument housing such that only a comparatively small amount of space is left unused. As a result the instruments can be built to have comparatively small outside dimensions. For example, the FIG. 1 instrument can be built with housing 10 having a diameter of about two inches, the lower limit on this dimension being the necessity for a readable scale on partition 16 rather than the size of tube 36. In the case of the FIG. 7 instrument the outside casing diameter can be less than one inch.

Each of the illustrated embodiments is further characterized by the provision of a fixed bearing (38, 58 or 100) which mounts the rotary indicator element (25, 64 or 86), and which at the same time is out of the way of the Bourdon tube. In each case the Bourdon tube can be centrally disposed in the instrument housing with the fixed bearing located thereabove so as to provide room for the centrally located pressure conduit 28 or 68. The arrangement is characterized by design simplicity and rigid mounting of the component mechanisms. Calibration of the instrument in each case can be accomplished by the use of the adjustable saddle 46 as previously described.

The invention has been illustrated in four embodiments, but it will be appreciated that it may be practiced in other forms as contemplated by the appended claim.

I claim:

In a pressure sensing instrument, an instrument housing having a partition therein defining a first sensing mechanism compartment and a second indicator mechanism compartment; a pressure supply conduit including a hollow post disposed centrally within the first compartment; a multi-convolution spiral Bourdon tube centered about said post and radiating therefrom in a single plane parallel with the partition; a fixed pivot shaft extending axially from the post through the partition; a hollow cup-shaped hub element rotatably telescoped on said pivot shaft; said hub element having a first portion thereof disposed in the first compartment and a second portion thereof disposed in the second compartment; an indicator element carried on the second portion of the hub element within the second compartment; and a force-transmitting connection between the outermost convolution of the Bourdon tube and the hub, said force transmitting connection comprising a first arm extending from the Bourdon tube toward the partition and generally parallel to the shaft axis, and a second arm extending radially from the first portion of the hub element across the first arm; said pivot shaft having a tip configured as a conical surface, and said hollow hub element having a conical internal surface engaged with said tip surface; the shaft tip surface having a lesser cone angle than the hub element internal surface.

References Cited by the Examiner

UNITED STATES PATENTS

| | | | |
|---|---|---|---|
| 1,164,573 | 12/1915 | Bristol et al. | 73—415 |
| 1,855,088 | 4/1932 | Boenker et al. | |
| 1,893,388 | 1/1933 | Bayer | 73—415 |
| 2,088,569 | 8/1937 | Beecher | 73—411 |
| 2,877,327 | 3/1959 | Hastings | 73—398 X |
| 3,053,094 | 9/1962 | Mangle | 73—431 |

LOUIS R. PRINCE, *Primary Examiner.*

RICHARD C. QUEISSER, *Examiner.*

EDWARD D. GILHOOLY, DONALD O. WOODIEL, *Assistant Examiners.*